United States Patent [19]

Fagerlund

[11] Patent Number: 4,578,149
[45] Date of Patent: Mar. 25, 1986

[54] PROCESS FOR DIGESTING CELLULOSIC MATERIAL WITH HEAT RECOVERY

[76] Inventor: Bertil K. E. Fagerlund, Praestvaegen 10, 18402 Osterskaer, Sweden

[21] Appl. No.: 434,758

[22] Filed: Oct. 18, 1982

Related U.S. Application Data

[63] Continuation-in-part of Ser. No. 240,804, Mar. 5, 1981, abandoned.

[51] Int. Cl.⁴ .............................................. D21C 11/00
[52] U.S. Cl. .......................................... 162/39; 162/47
[58] Field of Search ................ 162/248, 249, 250, 47, 162/49, 59, 61, 62, 60, 19, 39, 37, 239

[56] References Cited

U.S. PATENT DOCUMENTS

| | | | |
|---|---|---|---|
| 2,195,378 | 3/1940 | Dunbar | 162/30.1 |
| 2,671,727 | 3/1954 | Westcott et al. | 162/62 |
| 2,882,148 | 4/1959 | Rosenblad | 162/61 |
| 3,159,527 | 12/1964 | Helland | 162/61 |
| 4,236,961 | 12/1980 | Green | 162/61 |

*Primary Examiner*—Steve Alvo
*Attorney, Agent, or Firm*—Dirk J. Veneman; Raymond W. Campbell; Gerald A. Mathews

[57] ABSTRACT

A method for utilizing hot spent liquor, produced in a digester as the result of cooking a mass of cellulosic material with cooking liquor, is displaced from the top of the digester by pumping under pressure a displacing liquid into the base of the digester. The hot liquor so displaced is collected in an accumulator, and used to preheat another mass of cellulosic material as a preliminary to cooking of this other mass of material.

10 Claims, 6 Drawing Figures

PROCESS FOR DIGESTING CELLULOSIC MATERIAL WITH HEAT RECOVERY

This is a continuation-in-part of application Ser. No. 240,804, filed Mar. 5, 1981, now abandoned.

BACKGROUND AND SUMMARY

This invention relates to the digestion of cellulosic material such as wood chips in a batch-type process. The invention more particularly concerns a process for digesting cellulosic material featuring an efficient and practical manner of recovering heat used in the process.

In a conventional batch process for digesting wood chips, a digester is filled with chips and the digester is then charged with cooking chemical, which in a soda process comprises essentially a solution of sodium hydroxide, and in a kraft process comprises such a solution with the further inclusion of a sulphur compound. The digester is then sealed, and with steam the temperature of the digester is brought up to cooking temperature. At the conclusion of the cook a blow valve in the digester is opened and the contents of the digester discharged into a blow tank. Much of the heat energy acquired by the contents of the digester during the processing of the pulp exits through the blow tank with exhaust vapors. To recover such energy attempts have been made to pass such vapors through various forms of heat recovery systems. These recovery systems, however, have not been truly efficient. To conserve energy costs, some pulp manufacturers have chosen to install continuous digestion processes. Such a process ordinarily is characterized by a more efficient utilization of heat than is achieved with a conventional batch process. However, the cost of the equipment needed in a continuous process is substantially greater than the cost of the equipment required in a batch-type process.

The prior patent art of which I am aware illustrates various attempts of others to recover heat in spent liquor produced in a pulping process. An example of such prior art is U.S. Pat. 1,697,032 disclosing a sulphite process for cooking pulp. In the process described in this patent, hot liquor recovered in a blow pit is caused to flow down through a digester together with wood chips, thereby to obtain greater packing of the chips, and also some heating of the chips. However, with this process, as in the case of conventional batch-type soda and kraft processes described above, in discharging the contents of the digester into the blow pit, considerable energy exits from the blow pit with exhaust vapors.

U.S. Pat. No. 2,195,378 discloses a process for chemically producing pulp, wherein white liquor is heated within an accumulator by a heating coil heated by pumping spent liquor through the coil. There are practical problems involved in removing spent liquor from a cooked mixture in a digester using a pump as disclosed. Furthermore, it is difficult to recover heat energy in a practical manner from spent liquor having the temperature that such has when leaving the heating coil described in the patent.

Generally, therefore, it is an object of the invention to provide a process for the batch-type digestion of cellulosic material which makes possible the efficient recovery of heat energy in a practical manner.

With steam being the usual source of energy for operating a digestion process, a corollary of the above is to provide a batch-type digestion process having reduced steam requirements.

A further object of the invention is to provide a method for digesting cellulosic material, wherein heat is recovered from spent liquor residing in the digester after the final cook in a manner promoting efficient recovery even though relatively low temperature levels are involved.

As contemplated by the invention, spent liquor in the digester after cooking of the cellulosic material is displaced from the digester by admitting a displacing liquid which expels the spent liquor while replacing it in the digester. Pressure in the digester is maintained during this displacement to prevent flashing of the liquor. Spent liquor recovered in this manner is then utilized to supply heat to a subsequent digester charge.

Further contemplated in a specific embodiment of the invention is the collection of liquids displaced from a digester at two temperature levels. Liquid at a lower temperature level may be utilized in the initial preheating of a charge of cellulosic material within a digester by immersing the cellulosic material level may be utilized in further heating the cellulosic material, through displacement of the lower temperature liquid within the digester with the higher temperature liquid.

Other features and advantages of the invention include a more efficient use of cooking chemical in the digestion process and reduced use of cooking chemical; higher yields and improved quality of pulp by reason of greater selectivity in the delignification reaction which occurs; the capability of using the digester as an instrumentality performing a washing operation in the process; and control of scaling in heat exchanger equipment. Furthermore, existing facilities for carrying out batch digestion processees are readily converted to perform the method of the invention.

These and other objects and advantages of the invention will become more fully apparent as the following description is read in conjunction with the accompanying drawings, wherein.

DETAILED DESCRIPTION OF THE INVENTION

As indicated above, it is conventional, in the chemical digestion of pulp, following a batch-type process, to charge a digester with cellulosic material, i.e. wood chips, and then to introduce into the digester a reactive liquor including reactive chemical. In the case of the soda process, the reactive liquor, known as white liquor, is essentially an aqueous solution of liquor includes a sulphur compound. Digestion occurs with the contents of the digester at an elevated temperature and pressure, the temperature within the digester typically being within the range of from 330° to 350° F. (165° to 177° C.).

According to the present invention, at the conclusion of the cooking period, and with the maintaining of pressure in the digester, a displacement liquid is pumped into the bottom of the digester. As this displacement liquid fills up the digester from the bottom, it progressively expels and replaces the hot spent liquor or black liquor produced by the cook. This hot black liquor, it has been observed, leaves the digester at essentially the temperature of the digester at the conclusion of the cooking period, and may be collected in a high temperature, black liquor accumulator.

In a specific embodiment of the invention, it is preferred to employ, as the displacement liquid, the filtrate obtained from washing the pulp or delignified fibers obtained in earlier digestion of chips. Such filtrate has a temperature elevated from the usual room temperature (by reason of passing through the warm fibers), and in practicing the invention, such filtrate might be expected to have a temperature within the range of from 140° to 165° F. (60° to 74° C.).

When the volume of liquid displaced from the digester approaches the liquid-carrying capacity of the digester, i.e., the volume of the digester minus the volume taken up by the solids within the digester, the temperature of the liquid leaving the digester falls off, with such liquid becoming essentially the filtrate used in the displacement process. This liquid will have a somewhat higher temperature however, than the original filtrate, because of heating by the pulp fibers contained within the digester and digester shell.

The spent liquor at relatively high temperature which is displaced from the digester may be collected in a high temperature accumulator, and the lower temperature liquid which follows from the digester may be collected in a low temperature accumulator. These liquids, in turn, may be utilized in supplying part of the heat required to obtain proper cooking temperature in subsequent batches of cellulosic material. In performing this heating function, any liquor from the high temperature accumulator which, is lowered in temperature by exchanging heat may be collected in the low temperature accumulator.

Figure 1:
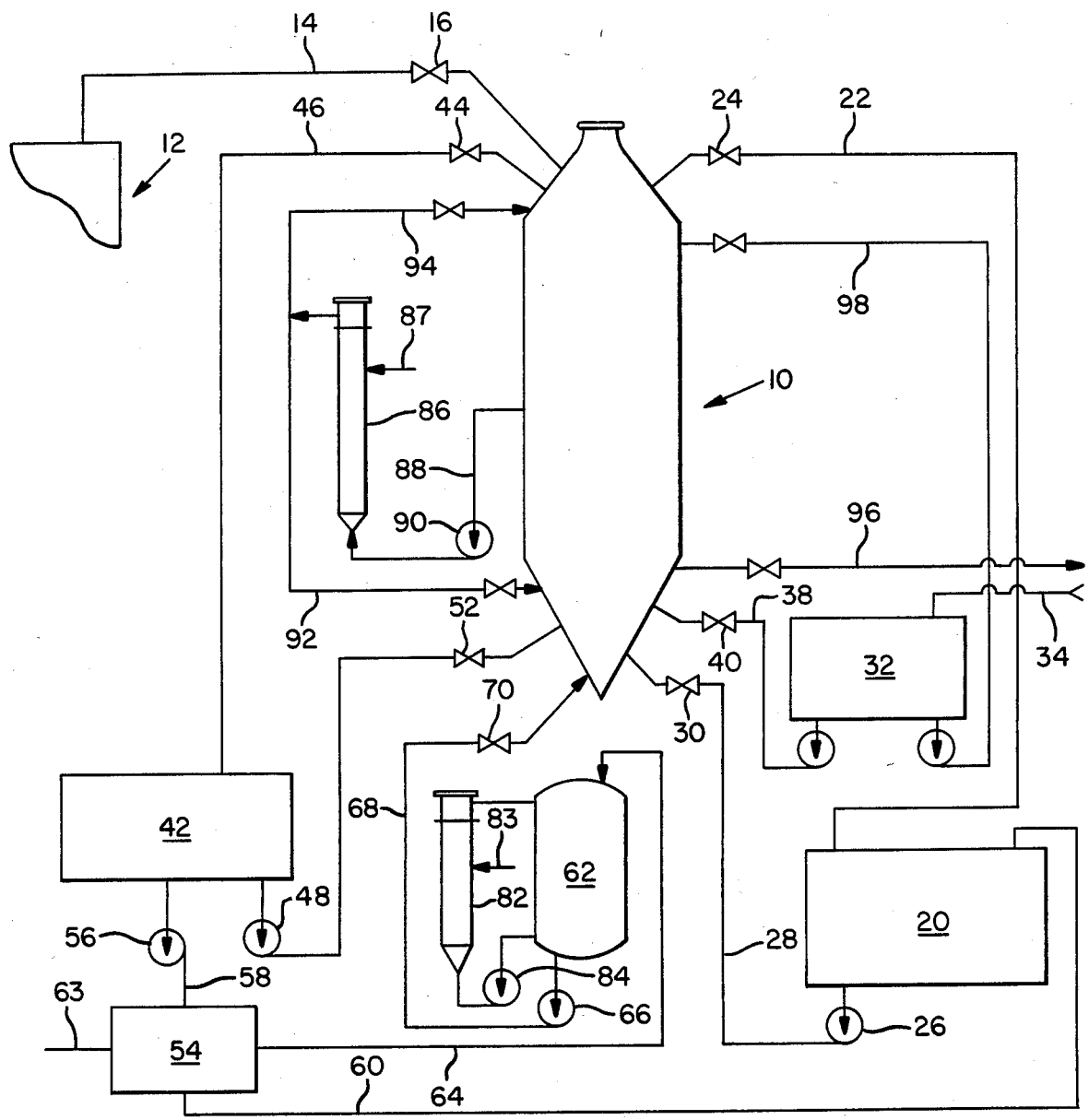
FIG. 1 is a schematic view illustrating, in simplified form, a digester and equipment associated with the digester which may be utilized in carrying out an embodiment of the invention.

Apparatus which is usable in carrying out the invention is schematically illustrated in FIG. 1. It should be understood that the illustration is schematic in form, with many instrumentalities such as gages, pressure vents, pumps and valves which would characterize an actual installation being eliminated from the drawing for reasons of simplicity.

Referring to FIG. 1 of the drawing, illustrated at 10 is a digester of a type typically used in the chemical digestion of wood chips. Although not specifically illustrated, such a digester is provided with a conventional detachable cover, which is removed for the purpose of charging the digester with wood chips.

Connecting with the top of the digester, and providing a path for the flow of liquid from the digester to a black liquor storage 12, is a valve-controlled conduit including conduit 14 and valve 16. In the making of pulp, spent black liquor recovered in storage 12 is converted, using conventional procedures, into white liquor which provides the active chemical required in the digestion of the wood chips. Details of this procedure are eliminated from this disclosure as they are unnecessary to an understanding of the invention.

Illustrated at 20 is a low temperature accumulator. A valve-controlled conduit including conduit 22 and valve 24 provides a path for the flow of liquid from the top of the digester into the low temperature accumulator. Liquid contained within the low temperature accumulator may be returned to the digester by actuating pump 26 which removes liquid from the accumulator and pumps such through conduit 28 and valve 30 into the bottom of the digester.

As earlier described, in carrying out the invention, spent liquor in the digester, after the cooking of the chips, is displaced from the digester with a displacement liquid, and preferably such is filtrate recovered from the first washer conventionally relied upon to wash pulp after such has been removed from the digester. A first washer filtrate storage is indicated at 32 which is supplied with filtrate through conduit 34. Filtrate may be removed from storage 32 and pumped into the base of the digester utilizing pump 36, conduit 38 and valve 40.

Hot spent liquor on being expelled from the digester is collected in a high temperature accumulator shown at 42. The liquor travels to the accumulator through valve 44 and conduit 46. Liquid within the high temperature accumulator may be introduced into the base of the digester utilizing pump 48, conduit 50 and valve 52 which connect with the bottom of the digester.

According to an embodiment of the invention, a portion of the liquor within the high temperature accumulator may be used preliminarily to heat white liquor containing reactive chemical introduced into the digester for cooking purposes. Thus, indicated at 54 is a heat exchanger. Hot liquor from the high temperature accumulator is pumped into the heat exchanger using pump 56 and conduit 58. Such liquor, after transferring much of its heat to the white liquor travelling through the exchanger, travels through conduit 60 into the low temperature accumulator 20.

Shown at 62 is a hot white liquor storage receptacle. White liquor pumped through the heat exchanger and entering the exchanger through conduit 63 travels through conduit 64 into receptacle 62. Hot white liquor is transferred from the receptacle to the base of the digester 10 by pump 66 which pumps the liquor through conduit 68 and valve 70.

If desired, means may be provided for heating the contents of receptacle 62 above the temperature of the liquor admitted to the receptacle by conduit 64. Such may be done by in the drawing, heating is performed utilizing a steam-operated heat exchanger 82 supplied steam through line 83, and by circulating the contents of receptacle 62 through the exchanger utilizing pump 84.

Additional heating means is provided for heating the contents of the digester up to final cooking temperature. Such heating means again may take various forms. In the particular equipment shown heating is performed with a steam-operated heat exchanger 86 supplied steam through line 87. Liquid from the digester enters the heat exchanger through conduit 88 and pump 90. Liquid leaving the exchanger is directed into the digester adjacent its top and bottom by conduits 92, 94.

The process of the invention will now be described as employed in a batch-type digestion of wood chips. In this discussion, typical temperature and volume relationships will be indicated, although it should be understood that these figures will vary from installation to installation. To initiate this explanation, it will be assumed that the high temperature accumulator contains liquid, i.e. hot black liquor, at a temperature of approximately 325° F. (163° C.). The low temperature accumulator contains liquid at approximately 210° F. (98.9° C.). How these conditions are obtained will be come apparent at a later part of this discussion.

Initially, the digester is filled with wood chips and such typically may have a temperature which is approximately room temperature, or 60° F. (15.5°).

Figure 2:
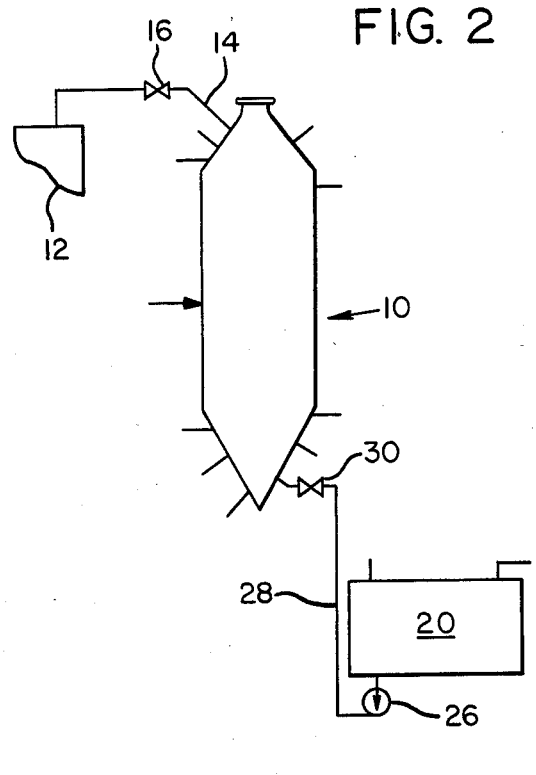
FIGS. 2 through 5 are simplified schematic drawings illustrating principal equipment used in different stages of the digestion process.

After closing off the top of the digester, and referring to FIG. 2 of the drawings, liquid from low temperature accumulator 20 is pumped into the digester completely to fill the digester (and to expel the air from the digester), and to immerse the chips therein with the liquid. Through direct contact of the liquid with the chips, the temperature of the chips is raised.

Assuming by way of example, the use of a digester having an internal volume of 6000 cubic feet (170 cubic meters), when such is filled with chips, roughly 400 cubic feet (11.3 cubic meters) will be taken up by the wood material. This leaves 5600 cubic feet (159 cubic meters) as the liquid-carrying capacity of the digester when such is filled with chips.

In filling with liquid from the low temperature accumulator, ordinarily slightly more than the liquid-carrying capacity would be introduced to the digester, for instance, 1.5 to 1.7 times this capacity, so that, in effect, there is a flushing of the chips with the low temperature liquid. This treatment with low temperature liquid has the effect of raising the temperature of the contents of the digester to approximately 200 degrees F. (93 degrees C.).

Excess low temperature liquid on leaving the digester is directed to black liquor storage 12. The low temperature liquor, having passed through the cold chip column, will have given up its last portion of heat energy liquor storage 12. Thus it can be seen that by the present method all useful heat energy in the liquor is maintained in the digester system.

Figure 3:
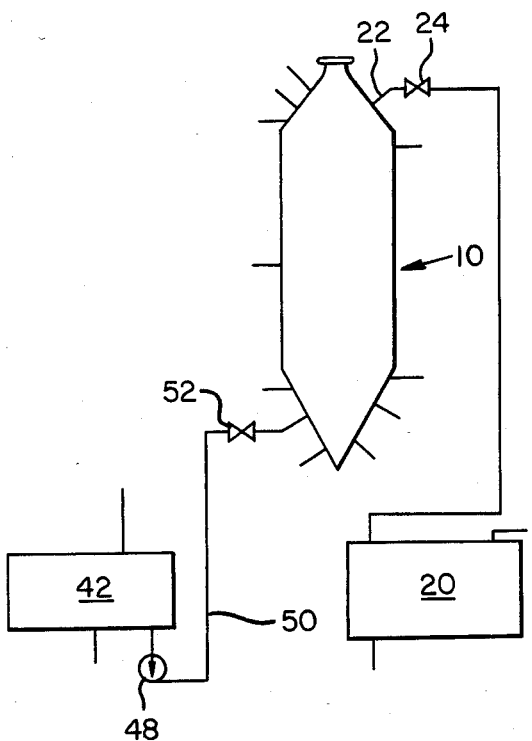

After such treatment with low temperature liquid initially to raise the temperature of the chips in the manner described, and referring to FIG. 3, liquor from high temperature asccumulator 42 is pumped into the base of the digester. During such pumping valve adjustments are made whereby the top of the digester is connected to the low temperature accumulator by line 22 as illustrated in FIG. 3. The high temperature liquor introduced into the base of the digester displaces the low temperature liquid previously introduced to the digester, and such low temperature liquid returns to the low temperature accumulator. Pumping is performed against a back pressure valve provided in line 22 whereby a pressure condition is maintained in the digester preventing flashing of the high temperature liquor.

It has been found that in this and other displacement steps which may be performed in the process, displacement of liquid within the digester by another liquid is substantially quantitative, which is to say that during the introduction of displacement liquor, up until the time that the liquid-carrying capacity of the digester has been reached, liquid leaves the digester is essentially the liquid initially in the digester.

For purposes of this invention, therefore, quantitative displacement shall mean the displacement of a liquid from a digester by another liquid which is introduced at one point in the digester and forces the charge of liquid quantitatively to a remote point in the container substantially as a unit. Thus, substantially the only mixing between the two liquids occurs at an interface zone which zone moves from said one point to said remote point to thereby keep intermixing of the two liquids to an absolute minimum. It can be seen, therefore, that by this process a relatively cool liquid can be used to displace a relatively hot liquid under pressure and recover said hot liquid substantially at its original temperature and pressure for later utilization in a subsequent process step. After introducing an amount of displacing liquid which is equal to the liquid carrying capacity of the digester, and with the introduction of more displacing liquid, the liquid leaving the digester becomes essentially the displacing liquid. This is demonstrated by making temperature determinations of the liquid leaving the digester as will later be discussed.

With the introduction of high temperature liquor in an amount equal to the liquid-carrying capacity of the digester, pumping may be stopped. The amount of high temperature liquor pumped also may be effected by the amount present in the high temperature accumulator, and how much may be pumped with a balancing of the system. Through drect contact of the high temperature liquor with the chips in the digester, the temperature of the chips is raised to nearly the temperature of the high temperature liquor, for example, a temperature of approximately 290° to 300° F. (143° to 149° C.).

Figure 4:
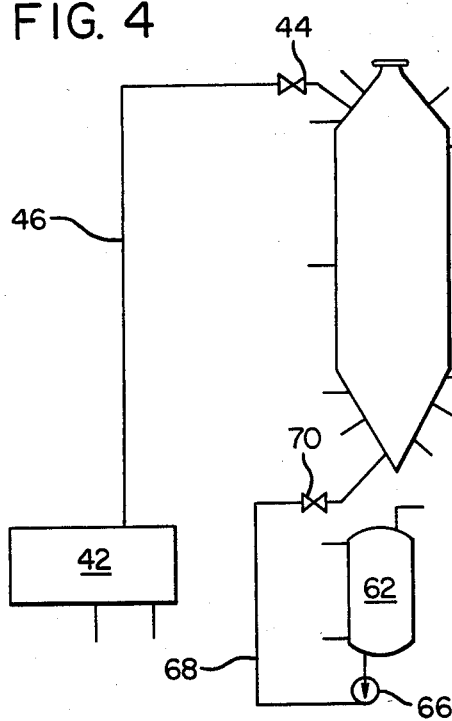

Referring to FIG. 4, at the conclusion of this step in the process, and with the chips now at their higher temperature level, white liquor from the hot white liquor storage receptacle 62 may be pumped into the base of the digester utilizing pump 66. With suitable valving adjustments made, hot liquor displaced from the digestor is returned to high temperature accumulator 42 as shown in FIG. 4. In a typical pulp process, from 25% to 35% of the liquid-carrying capacity of the digester is introduced at this time, since this is the extent of the white liquor usually needed to introduce into the digester the reactive chemical needed for digestion. Pumping is performed against a back pressure valve provided in line 46 whereby a pressure condition is maintained in the digester preventing flashing of liquor.

In practice, to save digester time, and to adjust white liquor concentration, the latter part of the hot black liquor fill and the white liquor fill may be done simultaneously.

As may be seen with reference to FIG. 1, hot black liquor from the high temperature accumulator may be pumped through heat exchanger 54 preliminarily to heat the white liquor pumped through the exchanger and delivered to storage receptacle 52. If it is desired to raise the temperature of the white liquor within storage receptacle 62 above the temperature produced by passing the liquor through exchanger 54, steam-operated heat exchanger 82 may be actuated, with circulation of white liquor through the exchanger using pump 84.

In the process of the invention, the temperature of the white liquor contained in the storage receptacle 62 might be within the range of 300° to 325° F. (150° to 163° C.).

With the digester now filled with the proper amount of white liquor, and the contents of the digester having a temperature within the range of 300° to 325° F., the temperature of the contents of the digester may be brought up to the temperature of the usual cook, i.e. 330° to 350° F. (165° to 177° C.), utilizing steam-operated heat exchanger 86, and with circulating of the contents of the digester through the exchanger employing pump 90.

Figure 5:
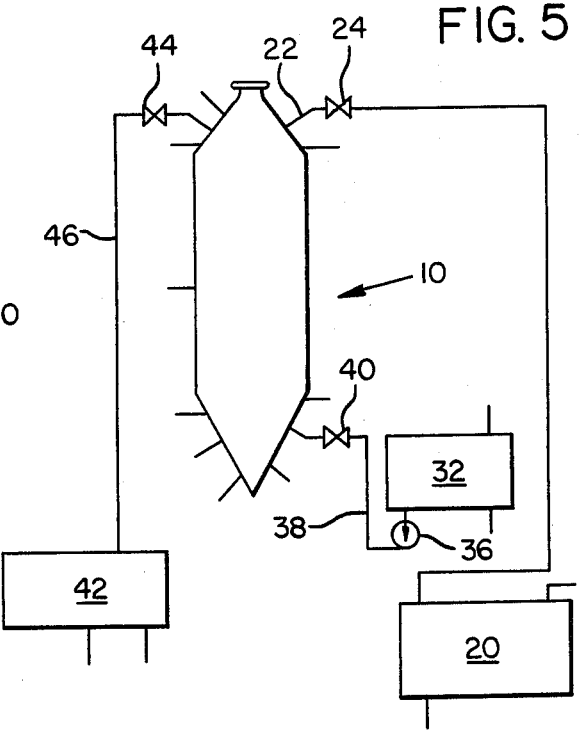

At the conclusion of the cooking period, the hot black or spent liquor now in the digester is displaced from the digester by pumping into the bottom of the digester stored filtrate from filtrate storage 32, as illustrated in FIG. 5. The liquor initially leaving the digester is directed to the high temperature accumulator with such having, for example, a temperature of approximately 330° F. (165° C.). Pressure is maintained within the digester to prevent flashing of liquor.

Figure 6:
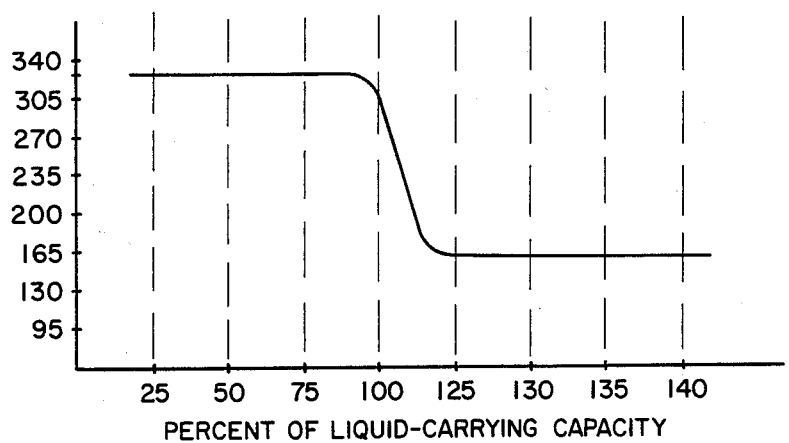
FIG. 6 is a graph illustrating the typical relationship existing between the temperature of liquor displaced from a digester and the amount of liquor displaced, expressed as a percent of the total liquid-carrying capacity of the digester.

As earlier discussed, the displacement of liquid within the digester through the pumping of a displacement liquid into the base of the digester is substantially quantitative, and this is borne out by temperature measurements made of the liquid leaving the digester. Thus, temperature measurements have been made of the liquid leaving the digester when stored filtrate from filtrate storage 32, is pumped into the base of the digester. FIG. 6 illustrates graphically the results obtained from such measurements. As can be seen with reference to FIG. 6, which charts the temperature of the liquid leaving the digester in relation to the volume of liquid introduced into the digester expressed as percent of the liquid-carrying capacity of the digester, up until the time that the volume of the pumped displacing liquid equals substantially the liquid-carrying capacity of the digester, the temperature of the liquid expelled remains substantially constant and at a temperature which is only slightly below the cooking temperature employed. Upon the volume of the displacing liquid introduced into the digester equaling the liquid-carrying capacity of the digester, the temperature of the liquid displaced drops off rather sharply. In practicing the invention, the filtrate pumped into the digester may conveniently be in an amount equaling approximately 120% of the liquid-carrying capacity of the digester. Liquid displaced during pumping into the digester of a volume equaling approximately the liquid-carrying capacity of the digester is directed to the high temperature accumulator. Remaining liquid traveling from the digester is directed to the low temperature accumulator, such having an average temperature approximately mid-way between the temperature of the filtrate used and the temperature of the hot liquor initially displaced.

After recovering the high and low temperature liquids as above described, the digested pulp fibers in the digester may be cleared from the digester in any of a number of ways. For instance, and referring to FIG. 1, pressurized steam may be introduced to the top of the digester to raise the pressure within the digester (insignificant increase in temperature occurring), and blow off line 96 opened, whereby the contents of the digester transfers to the usual blow tank. Alternatively, the contents of the digester may be removed from the digester utilizing a flushing fluid such as filtrate from storage 32 introduced through conduit 98. Whatever approach is used, after the pulp fibers are removed from the digester such are subsequently subjected to a washing, with the water used in such washing producing the first washer filtrate which is collected in filtrate storage 32. Since such washing liquid contacts warm pulp (and warm water is used for washing), the filtrate in the filtrate storage has a temperature elevated above room temperature.

Liquid supplied high temperature accumulator, in the embodiment of the invention described, is the spent liquor displaced from the digester at the conclusion of the cook. Liquid supplied low temperature accumulator is the hot black liquor which passes through exchanger 54, and filtrate used in the final stage of displacing liquor from the digester. These sources, and cooling resulting from heat transfer to chips, result in the liquid temperatures present in the accumulators.

Briefly summarizing some of the advantages of the process outlined and of modifications of this process, batch delignification may be employed with considerably less steam required to perform the heating operation then needed following conventional practice. This is because hot spent cooking liquor extracted from the digester is used as a principal heat source for succeeding digester batches.

Another advantage attained by the invention is a reduction in the white liquor needed to digest a charge of material. Residual active chemical present in spent liquor and in washing filtrate is reintroduced into the system, and this residual chemical is available for reaction with wood acids to neutralize these acids and for other initial reactions of the cook, before delignification with new white liquor occurs. As a consequence, cooking chemical in white liquor is not needed to perform these initial reactions. A somewhat related feature and advantage is greater selectivity in the delignification which occurs in the digester during the cook. At the time cooking occurs, there is a high concentration of active alkali which produces relatively rapid delignification which may be terminated before destruction of useful cellulose. Special chemicals introduced into a cooking liquor to improve its characteristics, also are conserved by reason of this reintroduction into the system.

Yet a further advantage of the invention is the obtaining of significant washing of the pulp in the digester as a result of displacement of the spent liquor after the cook with washing filtrate liquid. In effect, the digester is used as a containment vessel during the first washing of the pulp produced. In a new installation, this feature enables reduced cost for washing installations. In an existing installation, another washing step is permitted, with the advantages which flow from this.

Using conventional procedures, calcium contained in wood tends to dissolve to produce an increasing calcium ion concentration in the liquor during the initial phases of a cook when the load on heat exchanging equipment employed to heat the charge is high. With the hydroxyl ion concentration at this time being high, calcium carbonate starts precipitating, producing scaling in strainers and heat exchangers. Following the present invention, calcium ions are formed during contacting of the chips with the black liquor as a preliminary to charging with white liquor and before the hydroxyl ion concentration is high. When the white liquor is charged into the digester, there is an immediate and drastic increase in hydroxyl ions, and calcium carbonate precipitates in the chip column. At this there is no load on strainers and heat exchangers, and precipitation of the calcium carbonate in the strainers and heat exchangers is minimized. Thus, the invention offers control of scaling which has been a problem with conventional procedures.

A further advantage of the process outlined arises through the use of a hot liquor under pressure to displace another liquid in the digester. Pressure impregnation of the chips with the liquor under pressure occurs.

Finally, it should be noted that a conventional installation may be converted quite readily to apparatus utilizable in practicing the invention. This makes practicing the invention attractive to pulp processors who have been using conventional equipment and wish to lower their energy requirements.

The invention has been described in connection with the use of a single digester. Obviously, operating principles of the invention are applicable to digestion processes using one or multiple digesters.

While a particular embodiment of the invention has been described, modification and variations are possible without departing from the invention. Included within the invention, therefore, are such modifications and variations that would be apparent to one skilled in the art.

I claim:

1. In a batch digesting process wherein a digester is charged with a mass of cellulosic material and digesting liquor and the charge is then cooked at an elevated temperature and superatmospheric pressure to obtain within said digester, a column of delignified pulp and hot spent liquor, the improvement comprising:

after digestion of said cellulosic material, and while maintaining said column of delignified pulp substantially intact, quantitatively displacing the hot spent liquor under pressure by pumping into said digester a first volume portion of a lower temperature liquid, the volume thereof being approximately equal to the liquid carrying capacity of said digester, forcing said hot spent liquor out the top of said digester to a high temperature accumulator substantially at said super atmospheric pressure, quantitatively displacing liquor remaining in said digester out of the top of the digester by pumping a second volume portion of said lower temperature liquid into the digester, and while maintaining said hot spent liquor at said superatmospheric pressure, transferring said hot spent liquor to a second mass of cellulosic material to thereby conserve and utilize the sensible heat of said hot spent liquor under pressure to preheat said second mass of cellulosic material.

2. The method as claimed in claim 1 wherein said first volume portion of said lower temperature liquid which was used to quantitatively displace said hot spent liquor is heated by the residual heat in said mass of cellulosic material and is itself quantitatively displaced by continuing to pump additional volumes of said liquid into said mass of cellulosic material to thereby recover the sensible heat then present in said first volume portion of said liquid, and transferring said first volume portion of said liquid to another mass of cellulosic material to preheat said another mass of cellulosic material.

3. The method as claimed in claim 1 wherein a second digester containing said second mass of cellulosic material is first pressurized and then said hot spent liquor is pumped into said second digester under pressure to preheat said mass of cellulosic material.

4. A method as claimed in claim 3 wherein said first volume portion of said lower temperature liquid is pumped into said second digester to fill and pressurize said second digester and then said hot spent liquor is pumped into the bottom of said second digester to quantitatively displace said first liquor out the top of said second digester.

5. A method as claimed in claim 4 wherein after said hot spent liquor is pumped into said second digester, hot fresh liquor is pumped into said second digester and said second digester is brought up to final cooking temperature.

6. A method as claimed in claim 5 wherein said first liquor which is displaced from said second digester is transferred out of the digester system to black liquor storage and said hot fresh liquor displaces hot spent liquor which is transferred to yet another batch of cellulosic material to preheat said yet another batch of cellulosic material.

7. A method as claimed in claim 5 wherein said lower temperature liquid is washer filtrate obtained through washing of pulp.

8. A method as claimed in claim 3 wherein after said hot spent liquor is pumped into said second digester, hot fresh liquor is pumped into said second digester and said second digester is brought up to final cooking temperature.

9. A method for displacing a first temperature liquid from a digester containing cellulosic material and said liquid, with said liquid having impregnated and been absorbed by said cellulosic material, with the total volume of said liquid in said digester thereby exceeding the free liquid volume in the digester, said method comprising:

providing an inlet at the bottom and an outlet at the top of said digester;

pumping a first volume of a second temperature displacement liquid through said inlet to force said first liquid through said outlet, said first volume portion being approximately equal to the free liquid volume of the digester;

minimizing mixing of said first liquid and said displacement liquid as said displacement liquid is pumped into said digester, thereby establishing a minimal interface zone of liquid at an intermediate temperature between said first and second temperatures which zone migrates upwardly from said inlet to said outlet and flushes said first liquid out of said cellulosic material;

pumping a second volume portion of said displacement liquid through said inlet to force said intermediate temperature liquid in said interface zone through said outlet; and separately collecting said first temperature first liquid and said intermediate temperature liquid from said interface zone for separately utilizing the sensible heat remaining in at least said first temperature first liquid.

10. The method defined in claim 9 in which said first and second volumes of displacement liquid total a volume of approximately 120 percent of the free liquid volume of the digester.

* * * * *